United States Patent [19]
Tabe

[11] Patent Number: 6,004,240
[45] Date of Patent: Dec. 21, 1999

[54] BICYCLE HUB TRANSMISSION HAVING A TWO-PIECE DRIVER

[75] Inventor: Koshi Tabe, Sakai, Japan

[73] Assignee: Shimano, Inc., Osaka, Japan

[21] Appl. No.: 09/128,348

[22] Filed: Aug. 3, 1998

[30] Foreign Application Priority Data

Aug. 8, 1997 [JP] Japan ................................. 9-215235

[51] Int. Cl.⁶ ............................. F16D 23/00; F16H 3/74
[52] U.S. Cl. ........................................... 475/259; 192/64
[58] Field of Search ................................. 192/64, 103 R; 475/275, 280, 281, 259, 293, 296, 297

[56] References Cited

U.S. PATENT DOCUMENTS

| | | | |
|---|---|---|---|
| 3,600,974 | 8/1971 | Schwerdhofer et al. | 74/752 E |
| 3,603,178 | 9/1971 | Lutz et al. | 74/752 E |
| 4,276,973 | 7/1981 | Fukui | 192/47 |
| 4,580,670 | 4/1986 | Nagano | 192/64 |
| 4,674,617 | 6/1987 | Nagano | 192/64 |
| 4,858,494 | 8/1989 | Healy | 192/64 |
| 4,973,297 | 11/1990 | Bergles | 475/289 |

FOREIGN PATENT DOCUMENTS 858404  4/1939  France ................................. 192/64

*Primary Examiner*—Rodney H. Bonck
*Assistant Examiner*—Tisha D. Waddell
*Attorney, Agent, or Firm*—James A. Deland

[57] ABSTRACT

A bicycle hub transmission includes a hub axle, a driver rotatably mounted to the hub axle, and a slave rotatably mounted to the hub axle. The driver includes a first driving member and a second driving member axially aligned with the first driving member and nonrotatably coupled to the first driving member, wherein the slave is at least partially disposed within the second driving member. At least one of the first driving member and the second driving member define a housing space, and a power transmitting mechanism is disposed at least partially in the housing space for changing a rotational speed of the driver and for communicating rotational power from the driver to the slave.

23 Claims, 11 Drawing Sheets

FIG. 4A
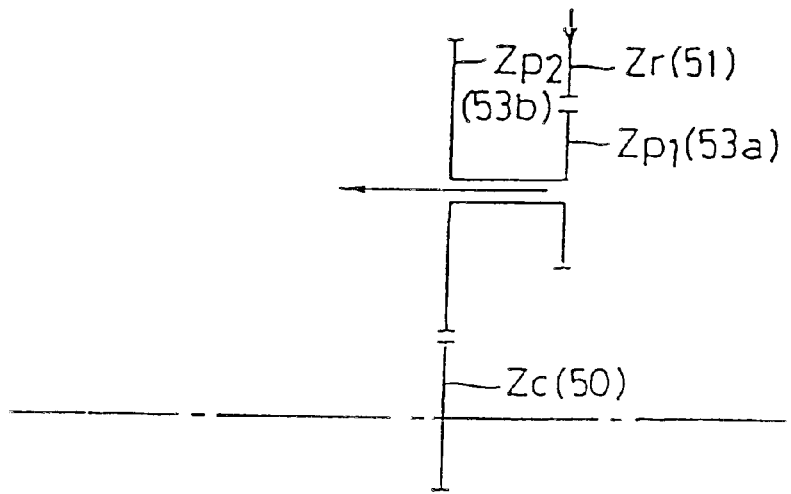
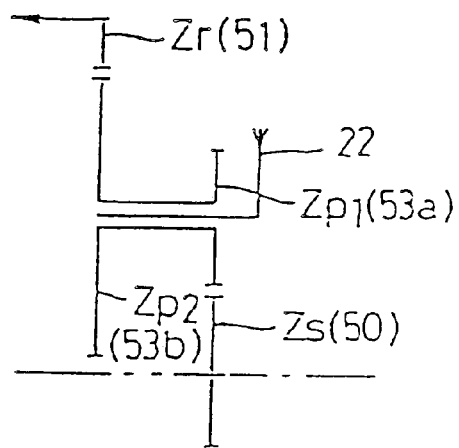
FIG. 4B

FIG. 10A
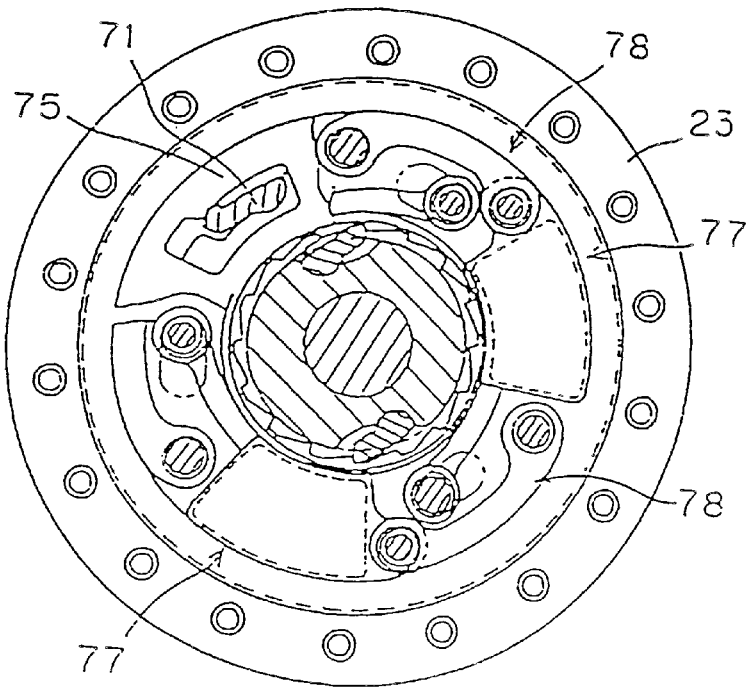
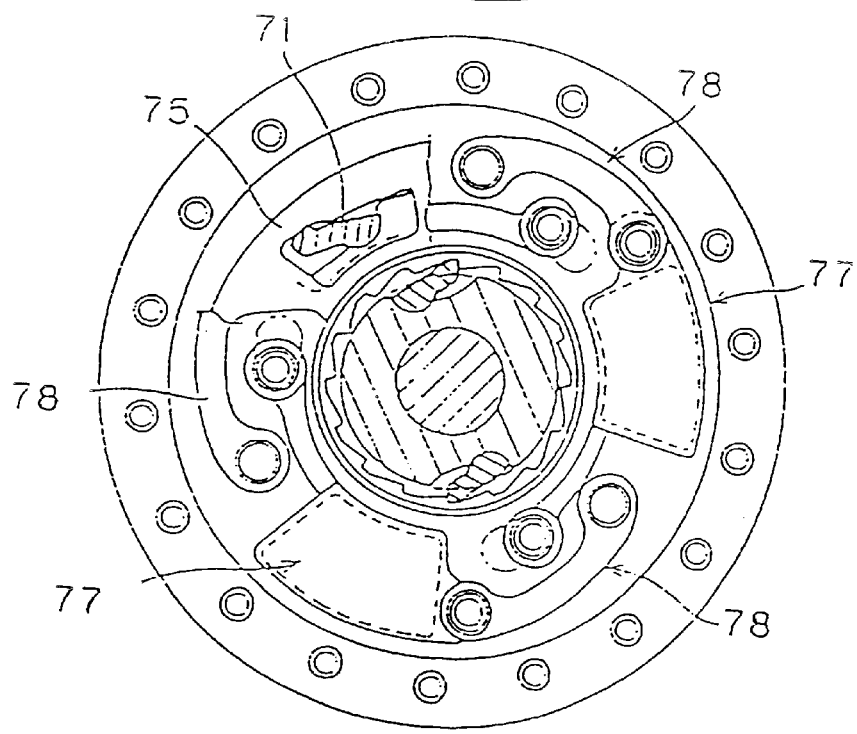
FIG. 10B

BICYCLE HUB TRANSMISSION HAVING A TWO-PIECE DRIVER

BACKGROUND OF THE INVENTION

The present invention is directed to bicycle transmissions and, more particularly, to a bicycle hub transmission using a planet gear mechanism for switching gear ratios.

Small bicycles (referred to as "BMX bicycles") having 20-inch wheels are used in off-road motocross racing. A fast start is an important element of BMX motocross racing. Thus, downshifting to a slightly lighter gear ratio than during normal riding is recommended during startup in order to achieve higher startup acceleration. For this reason, BMX bicycles used in motocross racing are equipped with an external shifter comprising a rear derailleur and a hub cog having two cross-ratio sprockets, wherein a shifting lever is linked by a cable to the rear derailleur. Installing an external shifter, however, makes it necessary for the rider to control this shifter by operating a shifting lever. Since BMX motocross racing involves navigating a course having a succession of small bumps and curves, the rider is busy steering and does not have much time for shifting. Consequently, it is very difficult to shift gears during a race.

To overcome this problem, the rear wheel may be equipped with an internal shifter hub, and the gears may be shifted automatically by changing the speed of the internal shifter hub in accordance with the bicycle speed. Such an internal shifter hub comprises a hub axle, a driver capable of rotating about the hub axle, a hub shell, a planet gear mechanism for changing the speed of rotation of the driver and transmitting the result to the hub shell, a clutch mechanism for transmitting the output of the planet gear mechanism to the hub shell or stopping such transmission, and a clutch-switching mechanism for switching the clutch mechanism by centrifugal force, for example.

Bearing components are provided between one end of the driver and the hub axle, between one end of the hub shell and the other end of the driver, and between the other end of the hub shell and the hub axle, thus allowing the driver and the hub shell to rotate about the hub axle. The planet gear mechanism comprises an inner-tooth gear, a sun gear, a plurality of planet gears for meshing with the inner-tooth gear and the sun gear, and a planet gear carrier for supporting the plurality of planet gears. The clutch-switching mechanism switches the clutch mechanism between an engaged state and a disengaged state using centrifugal force created by the rotation of the hub shell.

When the gear ratio of an internal shifter hub thus constructed is lowered slightly (that is, when the rotation of the hub shell remains mostly unchanged in relation to the rotation of the driver), the number of teeth of the inner-tooth gear must be fairly high in relation to the number of teeth of the sun gear. Consequently, the gap between the inner-tooth gear and the sun gear is increased, as is the outside diameter of the planet gears. The outside diameters of the planet gears are sometimes also increased when the gear ratio is raised. When, for example, a planet gear consists of two gear elements (a large element and a small element), the sun gear is caused to mesh with the small gear element, and the inner-tooth gear is caused to mesh with the large gear element. In either case, the outside diameter of the driver often must be increased when, for example, an inner-tooth gear is formed on the inner peripheral surface of the driver, and a downshift is performed by inputting motive force from the inner-tooth gear and providing an output from a carrier via the planet gears. Increasing the outside diameter of the driver results in a corresponding increase in the outside diameter of at least one of the bearing components provided at the two ends of the driver. This, in turn, results in an overall increased outside diameter of the internal shifter hub.

SUMMARY OF THE INVENTION

The present invention is directed to an internal shifting hub for a bicycle wherein the outside diameter of the hub is reduced even when large diameter planet gears are used in the planetary gear mechanism. In one embodiment of the present invention, a bicycle hub transmission includes a hub axle, a driver rotatably mounted to the hub axle, and a slave rotatably mounted to the hub axle. The driver includes a first driving member and a second driving member axially aligned with the first driving member and nonrotatably coupled to the first driving member, wherein the slave is at least partially disposed within the second driving member. At least one of the first driving member and the second driving member define a housing space, and a power transmitting mechanism is disposed at least partially in the housing space for changing a rotational speed of the driver and for communicating rotational power from the driver to the slave.

In a more specific embodiment, the first driving member comprises a first cylindrical body, and the second driving member comprises a second cylindrical body. The power transmitting mechanism comprises a planet gear mechanism including an inner-tooth gear disposed on the first cylindrical body, a sun gear disposed on the hub axle, a planet gear carrier rotatably mounted around the hub axle and linkable to the slave, and a plurality of planet gears rotatably mounted to the planet gear carrier and meshing with the sun gear and the inner-tooth gear. Each of the plurality of planet gears includes a smaller diameter gear element meshing with the inner-tooth gear and a larger diameter gear element disposed concentrically with the smaller diameter gear element in close proximity thereto and meshing with the sun gear. The first cylindrical body has a larger diameter portion and a smaller diameter portion, wherein the larger diameter gear element is disposed within the larger diameter portion. The inner-tooth gear is formed on an inner peripheral surface of the smaller diameter portion.

BRIEF DESCRIPTION OF THE DRAWINGS

FIG. 4(A) is a schematic diagram of the planet gear mechanism shown in FIG. 3;

FIG. 4 (B) is a schematic diagram of an alternative embodiment of a planet gear mechanism that may be used in an internal hub transmission according to the present invention;

FIG. 10(A) is a view taken along line VI—VI in FIG. 3 showing an alternative embodiment of a clutch mechanism in a disengaged state;

FIG. 10(B) is a view taken along line VI—VI in FIG. 3 showing the alternative embodiment of the clutch mechanism in an engaged state.

DETAILED DESCRIPTION OF THE EMBODIMENTS

Figure 1:
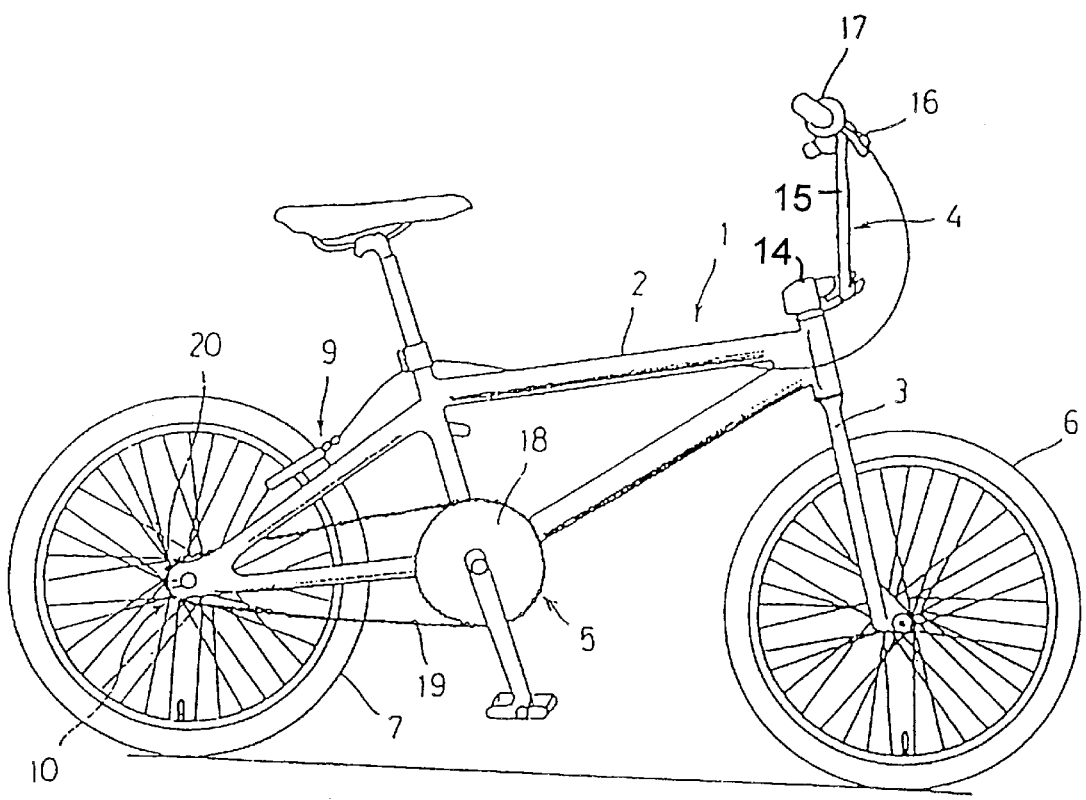
FIG. 1 is a side view of a bicycle that incorporates a particular embodiment of an internal hub transmission according to the present invention.

FIG. 1 is a side view of a bicycle that incorporates a particular embodiment of an internal hub transmission according to the present invention. In this embodiment, the bicycle is a BMX bicycle that comprises a frame 1 having a diamond-shaped frame body 2 and a front fork 3, a handle component 4, a driver unit 5, a front wheel 6, a rear wheel 7 provided with a two-speed internal shifter hub 10, and a cantilever-shaped sidepull rear brake device 9 for braking the rear wheel 7.

The handle component 4 has a handle stem 14 that is fixed to the top of the front fork 3 and a handlebar 15 that is fixed to the handle stem 14. A brake lever 16 and a grip 17, which control the rear brake device 9, are mounted on the right end of the handlebar 15. The driver unit 5 comprises a chainwheel 18 mounted in the lower portion (bottom bracket) of the frame body 2, a chain 19 wound around the chainwheel 18, and the internal shifter hub 10 equipped with a sprocket 20.

Figure 2:
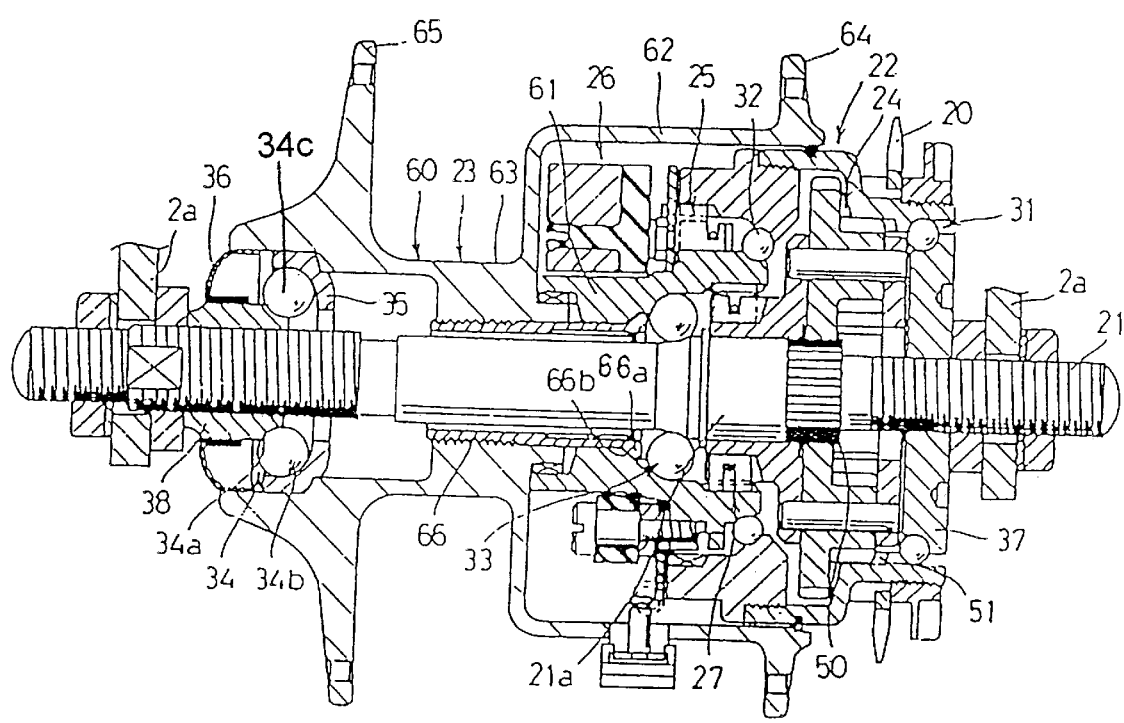
FIG. 2 is a cross sectional view of a particular embodiment of an internal shifter hub according to the present invention.
Figure 3:
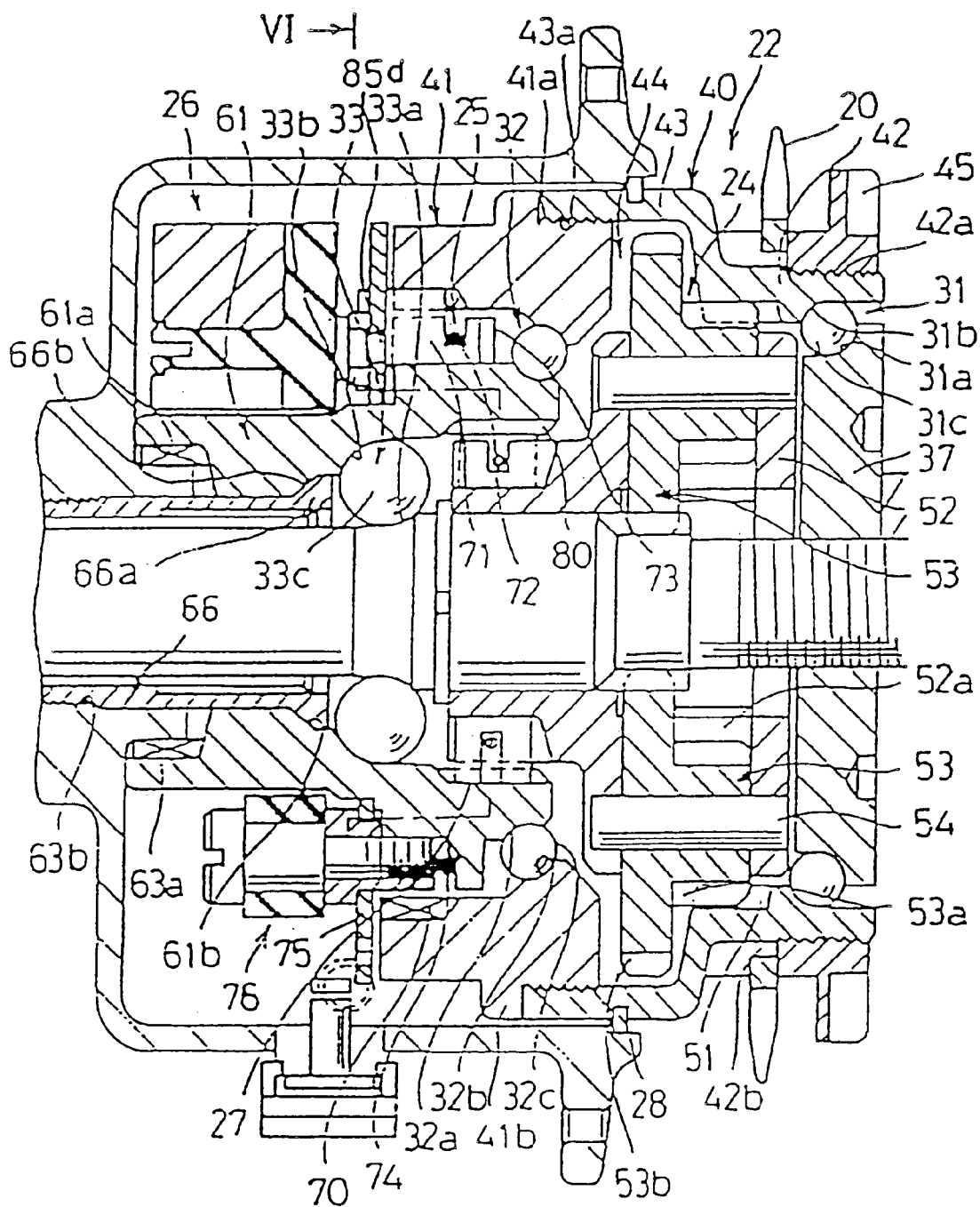
FIG. 3 is a detailed view of the right side portion of the hub shown in FIG. 2.

The internal shifter hub 10 is a two-step hub that includes downshifted and direct-coupled power transmission paths. As shown in FIGS. 2 and 3, internal shifter hub 10 comprises a hub axle 21 fixed in the rear fork ends 2a, a driver 22 rotatably mounted around the outside on one end of the hub axle 21, a slave 23 that is disposed farther outward around the outside of the hub axle 21 and the driver 22 and that is linked to the rear wheel 7, a planet gear mechanism 24 disposed around the inside of the driver 22, a clutch mechanism 25 for engaging and disengaging the driver 22 and the slave 23, a clutch-switching mechanism 26 for switching the clutch mechanism 25, and a one-way clutch mechanism 27 for transmitting rotation in the traveling direction alone from the planet gear mechanism 24 to the slave 23. The right end of the driver 22 is rotatably supported by a bearing component 31 on the hub axle 21, and the left end is rotatably supported by a bearing component 32 in the slave 23. The two ends of the slave 23 are rotatably supported by bearing components 33 and 34 on the hub axle 21.

As noted above, the hub axle 21 is fixed to the rear fork ends 2a of the bicycle frame body 2. Threaded portions for fixing or otherwise securing the axle in the rear fork ends 2a are formed on both ends of the hub axle 21. A large-diameter portion 21a is formed on the hub axle 21 somewhat to the right of the central section, and the sun gear 50 of the planet gear mechanism 24 is formed on the right side of the large-diameter portion 21a. Hub cone members 37 and 38 having arm-shaped hub cone surfaces 31a and 34a for the bearing components 31 and 34, respectively, are screwed onto the mounting portions of the hub axle 21 that lie inward in relation to the rear fork ends 2a.

Driver 22 is a member for transmitting the rotation of the sprocket 20. As shown more specifically in FIG. 3, the driver 22 comprises a first cylindrical component 40 and a second cylindrical component 41 that is nonrotatably linked to the first cylindrical component 40. The right end of the first cylindrical component 40 is rotatably supported by the bearing component 31, and the left end of the second cylindrical component 41 is rotatably supported by the bearing component 32.

The first cylindrical component 40 comprises a small-diameter portion 42 on the right side of FIG. 3, and a large-diameter portion 43 that is flared on the left side of the small-diameter portion 42. A housing space 44 for accommodating the planet gear mechanism 24 is formed inside the first cylindrical component 40. The outer peripheral surface at the end of the small-diameter portion 42 is provided with an external thread 42a, and a lock nut 45 for fixing the sprocket 20 is screwed thereon. A sprocket attachment section 42b composed of outer serrations is formed on the outer peripheral surface of the small-diameter portion 42 in proximity to the external thread 42a, with the sprocket 20 nonrotatably attached. The inner-tooth gear 51 of the planet gear mechanism 24 is formed on the inner peripheral surface of the small-diameter portion 42 on the side that faces the large-diameter portion 43. An arm-shaped ball race surface 31b for the bearing component 31 is formed on the inner peripheral surface at the end of the small-diameter portion 42. The bearing component 31 comprises the ball race surface 31b, the hub cone surface 31a, and a plurality of balls 31c interposed between the ball race surface 31b and the hub cone surface 31a.

An internal thread 43a, which is formed on the inner peripheral surface at the end of the large-diameter portion 43, is screwed onto an external thread 41a formed on the end face of the second cylindrical component 41, thus nonrotatably linking the first cylindrical component 40 and the second cylindrical component 41. A stop 41b that rests against the tip of the large-diameter portion 43 of the first cylindrical component 40 in proximity to the external thread 41a is formed in the outer peripheral surface of the second cylindrical component 41. The outside diameter of the stop 41b is essentially the same size as the outside diameter of the large-diameter portion 43 of the first cylindrical component 40. The bearing component 32 and the clutch mechanism 25 are disposed around the inside of the second cylindrical component 41. For this reason, the ball race surface 32b of the bearing component 32 and the ratchet teeth 70 of the clutch mechanism 25 are formed on the inner peripheral surface of the second cylindrical component 41. The bearing component 32 comprises the ball race surface 32b, a hub cone surface 32a formed on the outer peripheral surface at the end of a power transmitting body 61 of the slave 23, and a plurality of balls 32c interposed between the ball race surface 32b and the hub cone surface 32a. A seal ring 28 for sealing the gap formed by the slave 23 is fitted over the outer peripheral surface of the large-diameter portion 43 of the first cylindrical component 40.

Forming the driver 22 into a first cylindrical component 40 and a second cylindrical component 41 makes it possible to mount the planet gear mechanism 24 on the hub axle 21 without increasing the outside diameter of the second cylindrical component 41 even when a bearing component 32 is provided. The outside diameter of the entire hub can therefore be reduced.

As shown in FIG. 2, the slave 23 is a cylindrical member driven by the driver 22 for rotating the rear wheel 7. The slave 23 comprises a hub shell 60 that is partially disposed around the outside of the driver 22 and a power transmitting body 61 that is fastened to the hub shell 60 by a fixing bolt 66 and that is disposed around the inside of the driver 22.

This power transmitting body 61, in addition to functioning as a body for transmitting power from the driver 22 or the planet gear mechanism 24 to the hub shell 60, also functions as a weight support for the clutch-switching mechanism 26 described below.

The hub shell 60, which may be a cylindrical member made of aluminum, has a large-diameter mechanism housing 62 for accommodating the driver 22, the clutch-switching mechanism 26, and the like, and a small-diameter, narrow cylindrical component 63 formed integrally with the mechanism housing 62. Hub flanges 64 and 65 for securing the spokes (not shown) of the rear wheel 7 are integrally formed on the outer peripheral surfaces of the mechanism housing 62 and narrow cylindrical component 63. As shown in FIG. 3, the right end of the narrow cylindrical component 63 is provided with outer serrations 63a for nonrotatably securing the power transmitting body 61, and the inner peripheral surface is provided with an internal thread 63b for the threaded engagement of the fixing bolt 66. A space for accommodating the bearing component 34 is formed in the left end of the narrow cylindrical component 63, and a ball race member 35 provided with a ball race surface 34b is secured in this space. The bearing component 34 comprises the hub cone surface 34a, the ball race surface 34b, and a plurality of balls 34c interposed between the ball race surface 34b and the hub cone surface 34a. A dust cap 36 is fitted over the bearing component 34.

The power transmitting body 61 may be a stepped cylindrical member made of chromium-molybdenum steel. As shown in FIG. 3, inner serrations 61a for meshing with the outer serrations 63a of the narrow cylindrical component 63 are formed on the inner peripheral surface of the left end. The hub cone surface 32a for the bearing component 32 is formed on the outer peripheral surface at the right end of the power transmitting body 61, and ratchet teeth 80 constituting part of the one-way clutch mechanism 27 are formed on the inner peripheral surface of the right end. In addition, a ball race surface 33b for the bearing component 33 is formed on the inner peripheral surface in proximity to the ratchet teeth 80. The bearing component 33 comprises the ball race surface 33b, a hub cone surface 33a formed in the shape of an arm on the left end of the large-diameter portion 21a of the hub axle 21, and a plurality of balls 33c interposed between the hub cone surface 33a and the ball race surface 33b.

A tapered section 61b is formed on the inner peripheral surface of the power transmitting body 61 in proximity to the section constituting the ball race surface 33b. The fixing bolt 66 is a hollow cylindrical bolt, and the hub shell 60 and the power transmitting body 61 are firmly fastened in a concentric fashion. The head 66a of the fixing bolt 66 is provided with a tapered surface 66b for interlocking with the tapered section 61b, thus allowing the power transmitting body 61 and the hub shell 60 to be aligned and fastened.

The planet gear mechanism 24 comprises the sun gear 50 formed on the hub axle 21, the inner-tooth gear 51 formed on the small-diameter portion 42 of the first cylindrical component 40 of the driver 22, a carrier 52 rotatably mounted on the large-diameter portion 21a of the hub axle 21, and three planet gears 53 rotatably supported on the carrier 52. The carrier 52 is a member shaped as a collar flange with the hub axle 21 passing through it, and three gear housings 52a spaced at regular intervals in the peripheral direction are formed on the outer peripheral surface of this member. Three gear axles 54 for rotatably supporting the planet gears 53 are fixed to the carrier 52. The planet gears 53 have a small-diameter first gear element 53a for meshing with the inner-tooth gear 51 and a large-diameter second gear element 53b for meshing with the sun gear 50. The first gear element 53a and the second gear element 53b are formed adjacent to each other in the axial direction. The two gear elements 53a and 53b make it possible to obtain a gear ratio corresponding to a cross ratio with a smaller number of teeth on the inner-tooth gear than in the case of a single gear element.

As shown in FIG. 4a, the gear ratio GR can be expressed by the following equation for a downshift in the inner-tooth gear input and carrier output:

$$G_R = 1/(1+(Z_s/Z_r)\times(Z_{p2}/Z_{p1})),$$

where $Z_s$ is the number of teeth on the sun gear 50, $Z_r$ is the number of teeth on the inner-tooth gear 51, $Z_{p1}$ is the number of teeth on the first gear element 53a of a planet gear 53, and $Z_{p2}$ is the number of teeth on the second gear element 53b.

Here, the following result may be obtained if the number of teeth $Z_s$ on the sun gear is set to 15, the number of teeth $Z_r$ on the inner-tooth gear to 51, the number of teeth $Z_{p1}$ on the first gear element to 28, and the number of teeth $Z_{p2}$ on the second gear element to 13:

$$G_R = 1/(1+(15/57)\times(13/28)) = 0.891$$

Consequently, the gear ratio $G_R$ is 0.891, and a single turn of the driver 22 is transmitted to the slave 23 after being reduced in speed to 0.891 revolutions.

The gear ratio of the planet gear mechanism 24 should fall within a range of 0.8–0.95. In this case, a fast start can be accomplished, and the outside diameter of the internal shifter hub 10 reduced even when downshifting is performed at a cross ratio.

The gear ratio $G_R$ can be expressed by the following equation when downshifting is performed with the aid of planet gears consisting of a single gear element.

$$G_R = 1/(1+(Z_s/Z_r))$$

In this case, the gear ratio $G_R$ is determined solely by the number of teeth $Z_r$ on the inner-tooth gear and the number of teeth $Z_s$ on the outer-tooth gear. Let us solve the equation $0.891 = 1/(1+(15/Z_r))$ in an attempt to obtain a gear ratio of 0.891 with the aforementioned cross ratio by assuming that the number of teeth $Z_s$ on the sun gear is 15. As a result, the number of teeth $Z_r$ on the inner-tooth gear is 123, and the outside diameter of the driver 22 is increased at least twofold in comparison with a case in which the gear has two gear elements.

Figure 5:
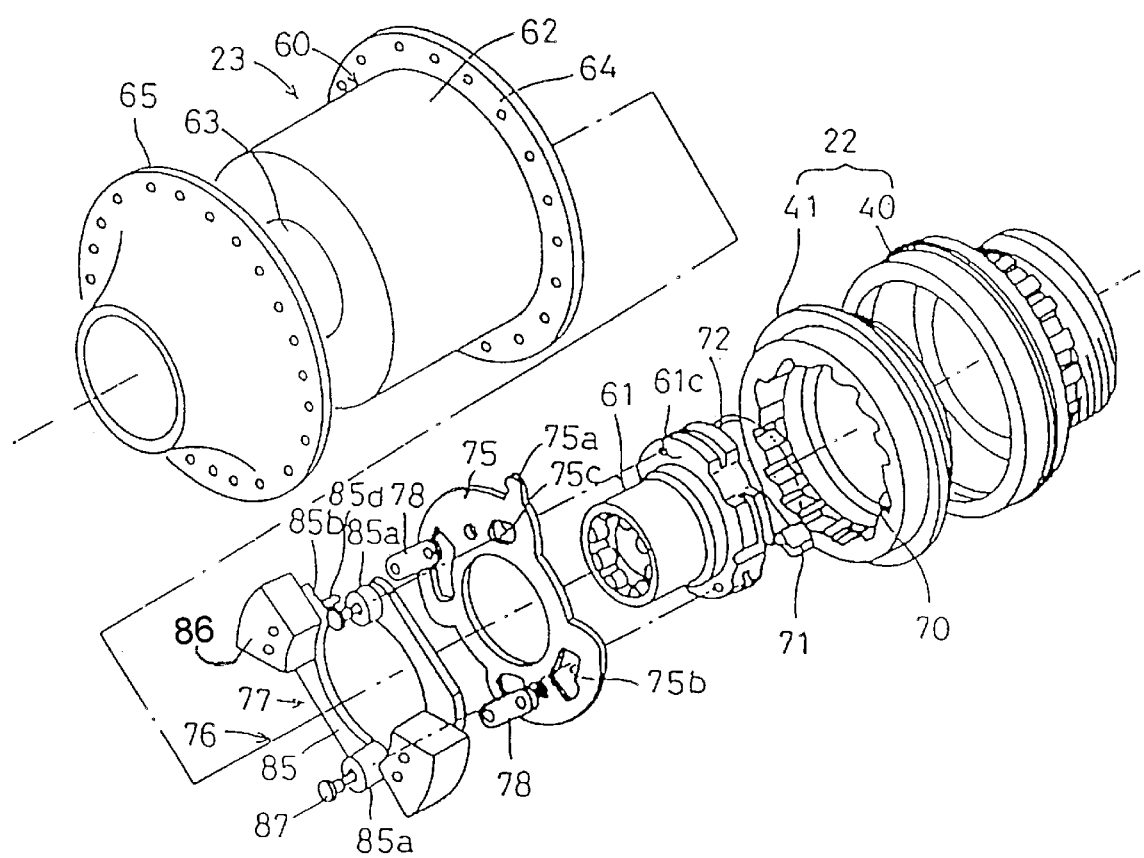
FIG. 5 is an exploded view of the clutch mechanism shown in FIG. 3.
Figure 6:
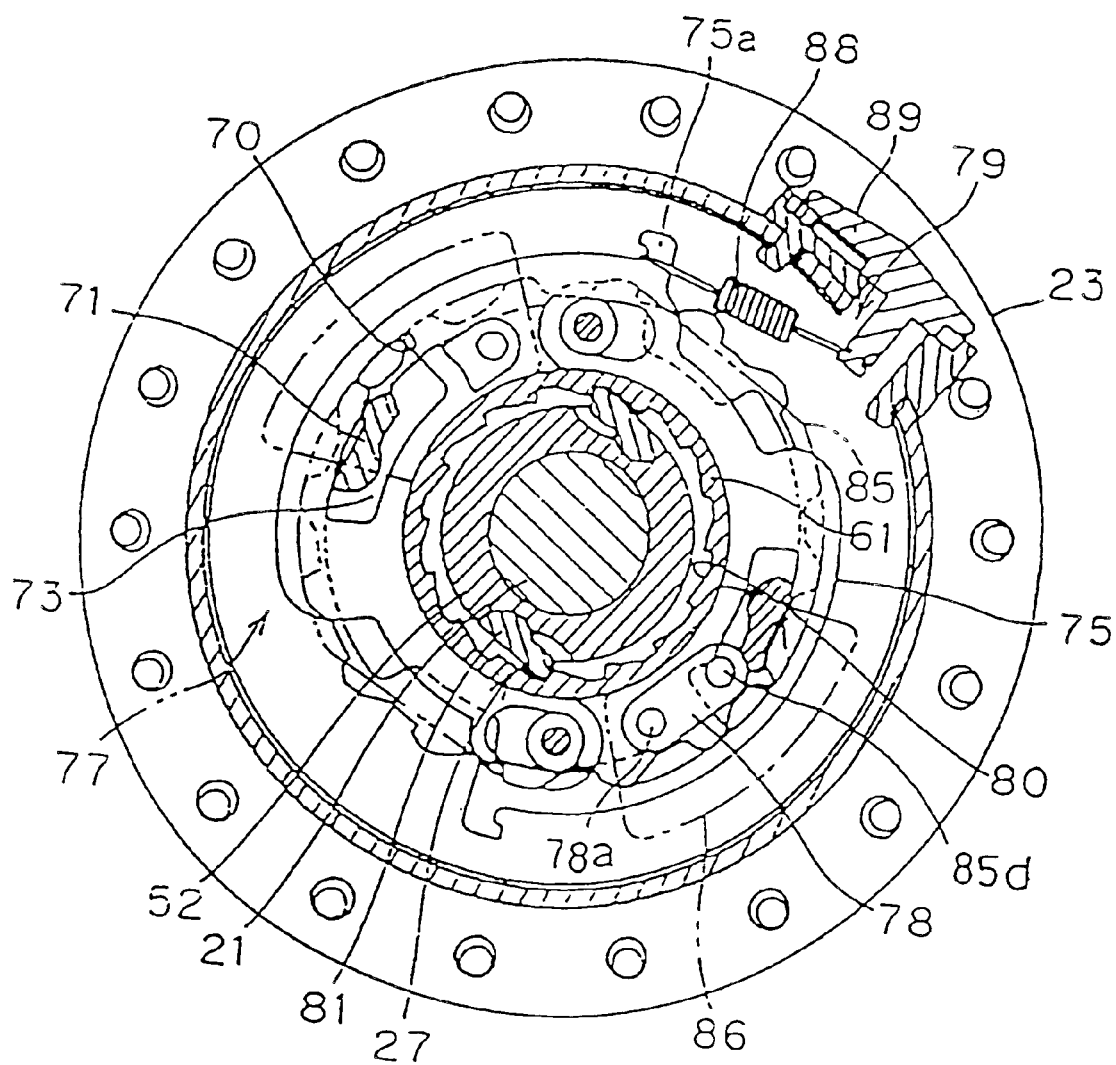
FIG. 6 is a view taken along line VI—VI in FIG. 3 showing the clutch mechanism in a disengaged state.

As shown in FIGS. 3, 5, and 6, the clutch mechanism 25 has ratchet teeth 70 formed as sawteeth on the inner peripheral surface of the second cylindrical component 41 of the driver 22, two clutch pawls 71 capable of meshing with the ratchet teeth 70, and a spring member 72 for biasing the clutch pawls 71. The clutch pawls 71 are mounted on the outer peripheral surface of the power transmitting body 61 while allowed to alternate between an engaged state in which they mesh with the ratchet teeth 70 and a disengaged state in which they are separated from the ratchet teeth 70. Pawl housings 73 for accommodating the clutch pawls 71 are provided at two positions on the outer peripheral surface of the power transmitting body 61. The spring member 72, which is positioned in a wound state in a groove 74 formed in the outer peripheral surface of the power transmitting body 61, biases the clutch pawls 71 into an engaged state. It is only when the clutch pawls 71 are in the engaged state and the driver 22 rotates in the traveling direction that the rotation of the clutch mechanism 25 is transmitted to the power transmitting body 61 of the slave 23.

Figure 7:
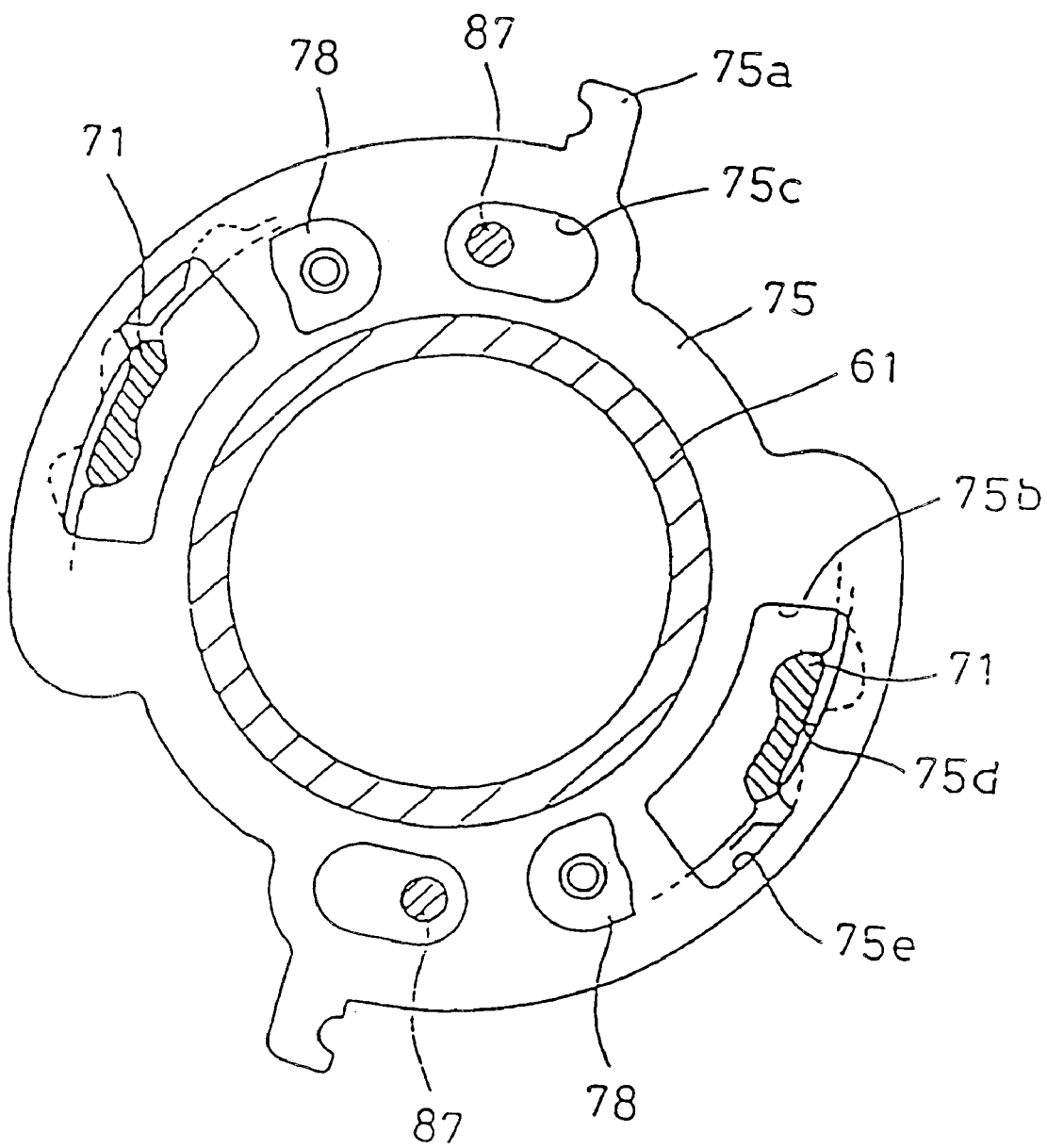
FIG. 7 is a front view of a control plate used in the clutch mechanism in a disengaged state.

The clutch-switching mechanism 26 comprises a control plate 75 for switching the clutch pawls 71 between the engaged state and the disengaged state, a moving mechanism 76 for moving the control plate 75 in a reciprocating fashion about the hub axle, and a weight support doubling as the power transmitting body 61. As shown in FIG. 7, the control plate 75 is a flat member shaped as a modified ring and rotatably supported in its central portion by the power transmitting body 61. A hook 75a extending radially outward is formed on the outer edge of the control plate 75, and two control windows 75b for controlling the clutch pawls 71 are formed between the inner and outer circumferences. The clutch pawls 71 are disposed such that they extend from the control windows 75b in the direction of the moving mechanism 76. The control windows 75b are provided with disengaging frames 75d for holding the clutch pawls 71 in a disengaged state, and with engaging frames 75e for switching the pawls to an engaged state. The clutch pawls 71 biased by the spring member 72 can be raised into the engaged state by shaping the linking frames 75e such that they extend radially outward from the disengaging frames 75d. The hook 75a, the control windows 75b, and all the other components are set apart 180 degrees from each other (depending on the number of elements) to achieve balanced rotation. In addition, two through holes 75c accommodating the rocking axles 87 of weight retainers 85 (discussed below) are formed between the inner and outer circumferences. The control plate 75 is normally held in a disengaged position (shown in FIGS. 6 and 7) by the spring mechanism 79 described below. At this time, the tips of the clutch pawls 71 are stopped by the disengaging frames 75d of the control windows 75b, and the pawls are held in a disengaged state.

As shown in FIG. 5, the moving mechanism 76, which is disposed on the left side of the control plate 75, comprises two rocking weight members 77, links 78 for linking the two respective weight members 77 and the control plate 75, and a spring mechanism 79 (FIG. 6) for energizing the control plate 75 clockwise in FIG. 6. The weight members 77 comprise two weight retainers 85 swingably mounted on the end face 61c of the power transmitting body 61 and weights 86 mounted on the tips of the weight retainers 85. The two weight retainers 85 may be made of a polyacetal resin. The weight retainers 85 are formed such that they form a curve around the power transmitting body 61, and they are positioned in the same way 180 degrees apart from each other around the power transmitting body 61. Bosses 85a are formed integrally with the bases of the weight retainers 85, and weight mounting components 85b composed of two protruding pins are formed integrally with the tips of the weight retainers 85. The rocking axles 87 pass through the bosses 85a. The rocking axles 87 also pass via the through holes 75c, and the tips of these axles are fixed to the power transmitting body 61. In addition, link pins 85d are formed integrally with the tips of the weight retainers 85 on the sides opposite from the weight mounting components 85b. The link pins 85d are used for the rotatable mounting of the links 78. The weights 86, which may be fan-shaped members made of lead or steel, are fixed by the two pins of weight mounting components 85c.

The links 78 are members for rotating the control plate 75 in response to the movement of the tips of the weight members 77 which are swung by the bases. The control plate 75 and the tips of the weight retainers 85 are linked to the two ends of these links. The links 78 are flat members made of metal. One end of each link is provided with a round hole for inserting the link pins 85d, and the other end is provided with a round hole for inserting a link pin 78a, which is used to achieve linkage with the control plate 75.

As shown in FIG. 6, the spring mechanism 79 has a coil spring 88, one end of which is secured to the hook 75a, and a spring force adjustment mechanism 89 for adjusting the spring force of the coil spring 88. Shift timing can be adjusted by adjusting the spring force of the coil spring 88. The shift timing can also be varied by replacing the weights 86.

The one-way clutch 27, which may be a pawl type, comprises ratchet teeth 80 formed on the inner peripheral surface of the power transmitting body 61, clutch pawls 81 mounted on the outer peripheral surface of the carrier 52 of the planet gear mechanism 24 while allowed to alternate between an engaged state and a disengaged state, and a spring member (not shown) for biasing the clutch pawls 81 into the engaged state. In the one-way clutch 27, the clutch pawls 81 are normally raised into the engaged state, and the rotation of the carrier 52 is transmitted to the power transmitting body 61 when this carrier rotates in the traveling direction. No rotation is transmitted when the power transmitting body 61 rotates in the traveling direction at a higher speed than does the carrier 52.

The internal shifter hub 10 has the following paths because of the presence of such a planet gear mechanism 24, clutch mechanism 25, clutch-switching mechanism 26, and one-way clutch 27:

a downshifted power transmission path composed of the driver 22, inner-tooth gear 51, planet gear mechanism 24, carrier 52, and slave 23; and a direct-coupled power transmission path composed of the driver 22, clutch mechanism 25, and slave 23.

When the rider steps on the pedals during startup and propels the bicycle, the resulting rotation is transmitted to the driver 22 via the sprocket 20. At this time, the control plate 75 is in a disengaged position, and the clutch pawls 71 arc held in a disengaged state by the control plate 75. Consequently, there is no linkage between the driver 22 and the power transmitting body 61, and the rotation of the driver 22 is transmitted to the power transmitting body 61 along the downshifted power transmission path. As a result, the rotation of the sprocket 20 during startup is transmitted to the hub shell 60 after being reduced in speed to 0.891, for example. It is therefore possible to lightly step on the pedals during startup while still achieving a fast start.

Figure 8:
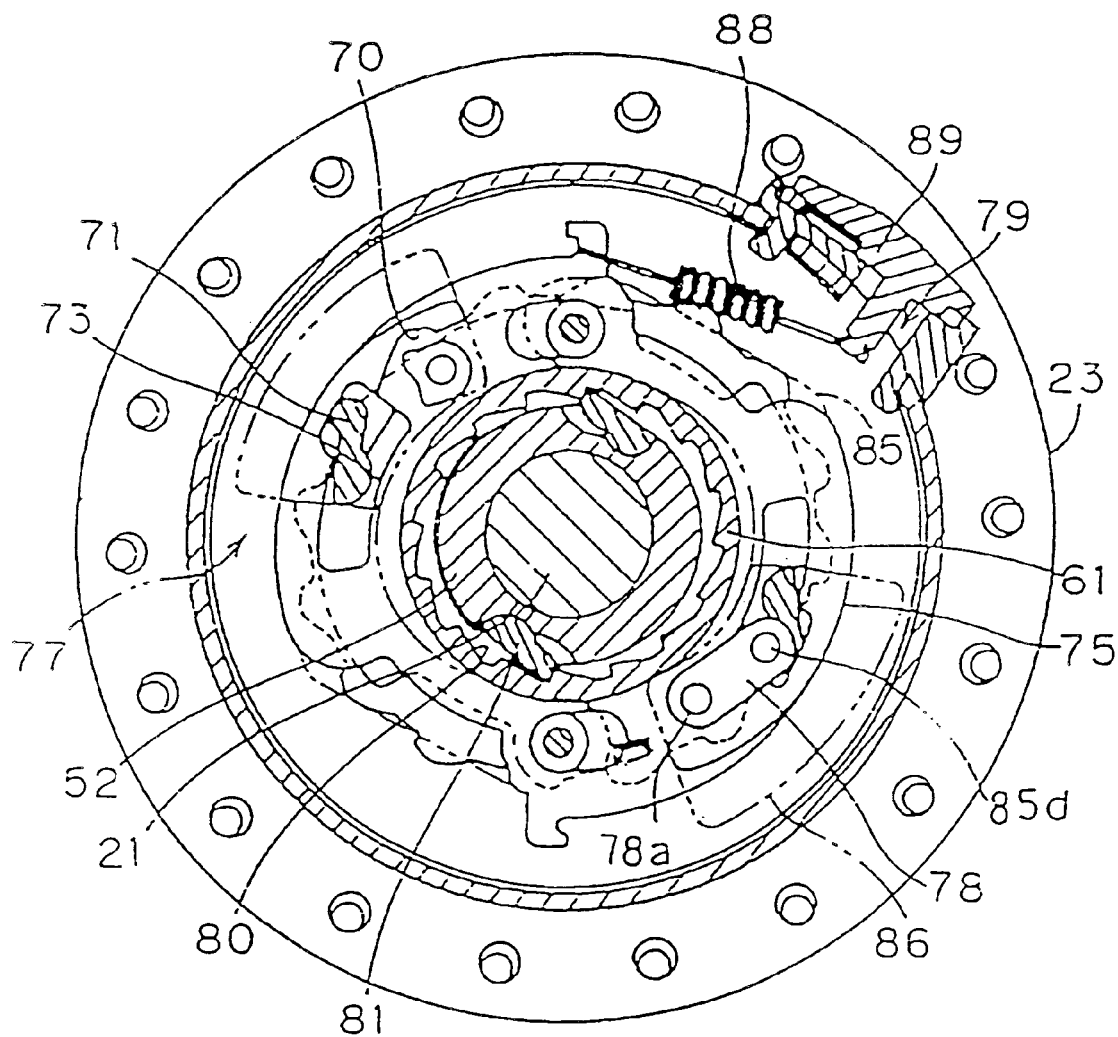
FIG. 8 is a view taken along line VI—VI in FIG. 3 showing the clutch mechanism in an engaged state.
Figure 9:
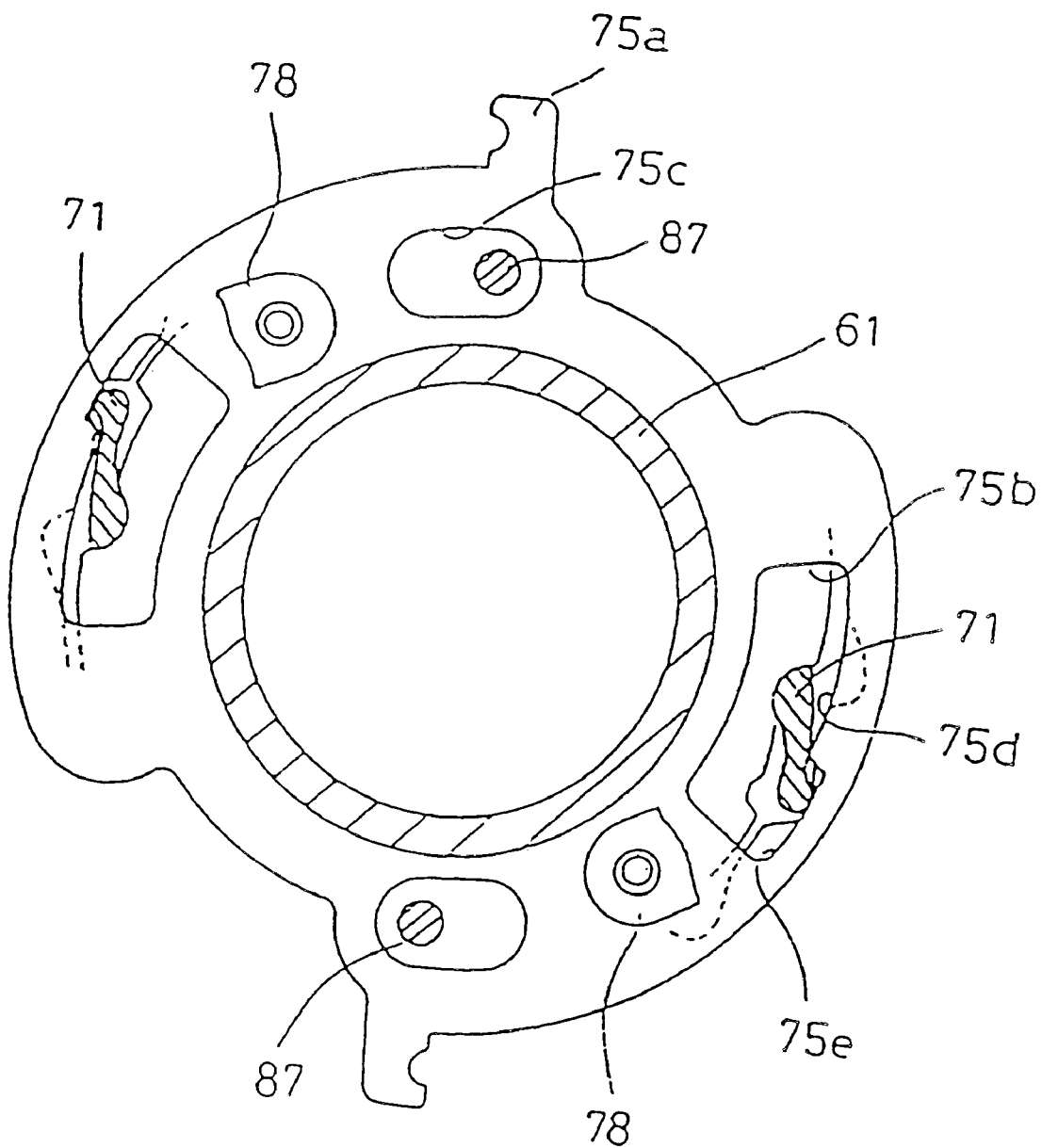
FIG. 9 is a front view of the control plate used in the clutch mechanism in an engaged state.

As shown in FIGS. 8 and 9, the weight members 77 swing outward against the action of the biasing force exerted by the coil spring 88 of the control plate 75 when the power transmitting body 61 achieves a rotational speed above a certain level. This level is determined by the adjustment of the spring mechanism 79, the mass of the weights, or the like. When the weight members 77 move in this manner, the control plate 75 is rotated counterclockwise in FIG. 8 through the intermediary of the links 78 until it reaches an engaged position. When the control plate 75 has reached the engaged position, the linking frames 75e of the control windows 75b position themselves at the tips of the clutch pawls 71, and the clutch pawls 71 are raised into the engaged state by the biasing force of the spring member 72. As a result, the rotation of the driver 22 in the traveling direction is transmitted directly to the power transmitting body 61 along the direct-coupled power transmission path, and the rotation of the sprocket 20 is transmitted unchanged to the rear wheel 7. Consequently, an upshift is performed once the rotational speed has exceeded a certain level. There is no reduction in the transmission efficiency of the planet gear mechanism 24 during this regular ride because the driver 22 and the slave 23 are coupled directly.

When the rotational speed of the power transmitting body 61 drops below a prescribed level during cornering or the like, the weight members 77 are returned to their initial disengaged state by the coil spring 88, and the rotation of the driver 22 is transmitted to the slave 23 along the downshifted power transmission path.

While the above is a description of various embodiments of the present invention, further modifications may be employed without departing from the spirit and scope of the present invention. For example, the size, shape, location or orientation of the various components may be changed as desired. The functions of one element may be performed by two, and vice versa.

The number of weight members or clutch pawls is not limited to two. One member or pawl can also be used, as can three or more members or pawls. When three or more members or pawls are used, they should be arranged at regular intervals according to their number. When, for example, there are three weight members 77, they should be arranged in the same way 120 degrees apart from each other about the hub axle, as shown in FIG. 10a. Furthermore, a single clutch pawl 71 can be used, as can a plurality of such pawls. In this case, the weight members 77 swing outward when the rotational speed has exceeded a certain limit (as shown in FIG. 10b), the control plate 75 is rotated through the intermediary of the links 78, and the clutch pawls 71 rise to an engaged state from the disengaged state. Thus, the centrifugal force increases with an increase in the number of weight members 77, and the braking plate 75 rotates with more stability.

The embodiment described above pertained to a case in which the speed was changed from direct to reduced, but a shift from a direct speed to a higher speed is also possible. In this case, the driver 22 should be linked to the carrier 52, and power should be transmitted from the carrier 52 to the inner-tooth gear 51, as shown in FIG. 4b. At this time, a high gear ratio can be obtained with an inner-tooth gear whose outside diameter is less than that of a single gear element if the second gear element 53b (which, of the two gear elements 53a and 53b, has the larger diameter) is caused to mesh with the inner-tooth gear 51, and the small-diameter first gear element 53a is caused to mesh with the sun gear 50. In addition, the carrier 52 and the driver 22 should be linked together with the aid of the structure shown in FIG. 4a if the goal is obtain an upshifted ratio corresponding to a cross ratio.

Figure 11:
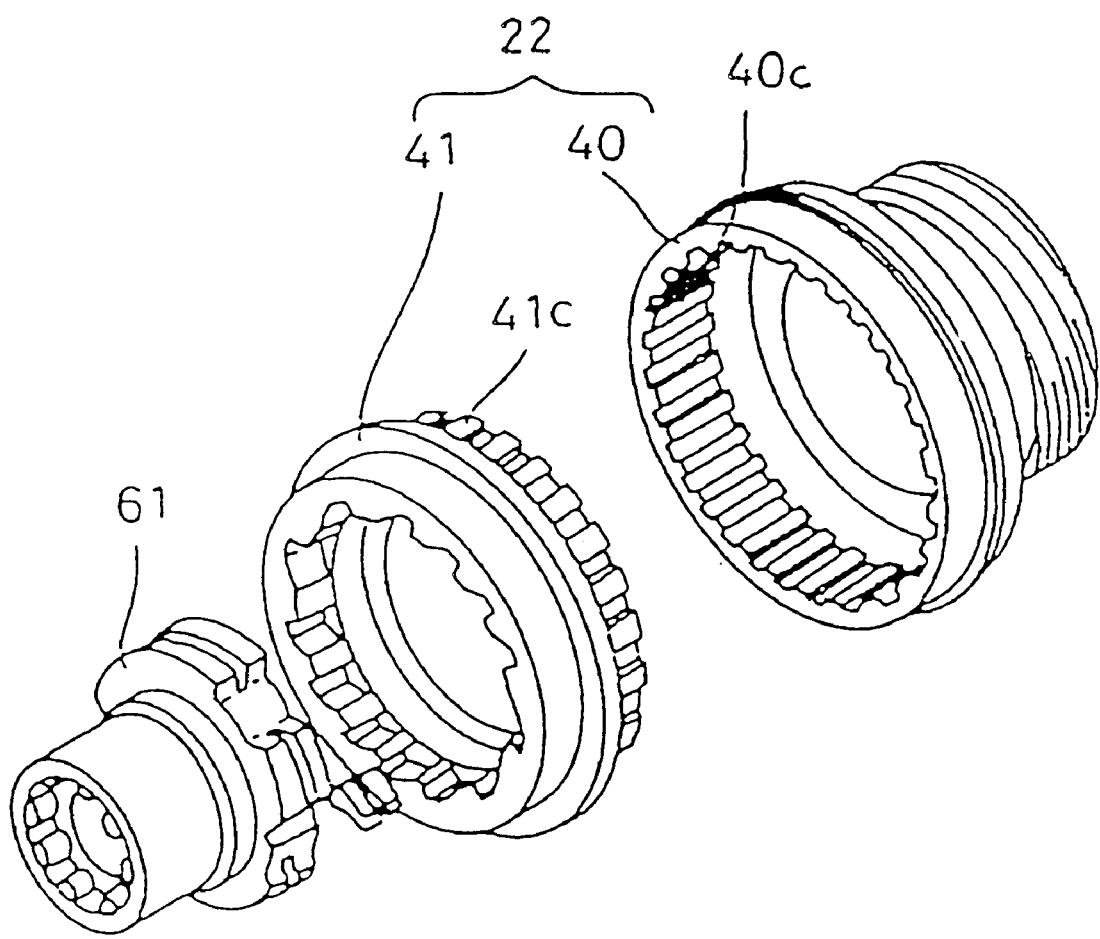
FIG. 11 is an exploded view of an alternative embodiment of a driver that may be used in the internal hub transmission according to the present invention.

Although the embodiment described above pertained to a case in which the first cylindrical component 40 and the second cylindrical component 41 of the driver 22 were fixed with the aid of a thread, it is also possible, for example, to provide the first cylindrical component 40 and the second cylindrical component 41 with serrations 40c and 41c, respectively, and to fix the two cylindrical components by meshing with the serrations, as shown in FIG. 11.

Thus, the scope of the invention should not be limited by the specific structures disclosed. Instead, the true scope of the invention should be determined by the following claims.

What is claimed is:

1. A bicycle hub transmission comprising:
   a hub axle;
   a driver rotatably mounted to the hub axle, wherein the driver includes:
      a first driving member having a smaller portion with a smaller diameter inner peripheral surface;
      a second driving member axially aligned with the first driving member and nonrotatably coupled to the first driving member, wherein the second driving member has a smaller diameter portion with a smaller diameter inner peripheral surface; and
      wherein at least one of the first driving member and the second driving member has a larger diameter portion with a larger diameter inner peripheral surface defining a housing space axially between the smaller diameter inner peripheral surface of the first driving member and the smaller diameter inner peripheral surface of the second driving member;
   a slave rotatably mounted to the hub axle, wherein the slave is at least partially disposed within the second driving member; and
   a power transmitting mechanism disposed at least partially in the housing space for changing a rotational speed of the driver and for communicating rotational power from the driver to the slave.

2. The hub transmission according to claim 1 wherein the first driving member comprises a first cylindrical body, and wherein the second driving member comprises a second cylindrical body.

3. The hub transmission according to claim 2 wherein an outside diameter of one of the first cylindrical body and the second cylindrical body is not greater than an outside diameter of the other one of the first cylindrical body and the second cylindrical body.

4. The hub transmission according to claim 2 wherein an outer peripheral surface of the first cylindrical body includes an input unit attachment structure for nonrotatably attaching an input unit that receives external rotational power.

5. The hub transmission according to claim 2 further comprising:
   a first ball race disposed on the first cylindrical body for rotatably supporting the first cylindrical body relative to the hub axle; and
   a second ball race disposed on the second cylindrical body for rotatably supporting the second cylindrical body relative to the hub axle.

6. The hub transmission according to claim 2 wherein the first cylindrical body is connected to the second cylindrical body through a threaded joint.

7. The hub transmission according to claim 2 wherein the first cylindrical body is connected to the second cylindrical body through a serration joint.

8. The hub transmission according to claim 2 wherein one of the first cylindrical body and the second cylindrical body has a tip that abuts against an abutment on the other one of the first cylindrical body and the second cylindrical body.

9. The hub transmission according to claim 2 wherein the power transmitting mechanism comprises a planet gear mechanism.

10. The hub transmission according to claim 9 wherein the planet gear mechanism comprises:
    an inner-tooth gear disposed on the first cylindrical body;
    a sun gear disposed on the hub axle;
    a planet gear carrier rotatably mounted around the hub axle and linkable to the slave; and
    a plurality of planet gears rotatably mounted to the planet gear carrier and meshing with the sun gear and the inner-tooth gear.

11. The hub transmission according to claim 10 wherein the inner-tooth gear is integrally formed on an inner peripheral surface of the first cylindrical body, and wherein the sun gear is integrally formed on an outer peripheral surface of the hub axle.

12. The hub transmission according to claim 10 wherein each of the plurality of planet gears comprises:

a smaller diameter gear element meshing with the inner-tooth gear; and a larger diameter gear element disposed concentrically with the smaller diameter gear element in close proximity thereto and meshing with the sun gear.

13. The hub transmission according to claim 12 wherein the first cylindrical body has the larger diameter portion, and wherein the larger diameter gear element is disposed within the larger diameter portion.

14. The hub transmission according to claim 13 wherein the inner-tooth gear is formed on the smaller diameter inner peripheral surface of the first driving member.

15. The hub transmission according to claim 14 further comprising:

a clutch mechanism switchable between an engaging position for engaging the slave and the second cylindrical body and a disengaging position for disengaging the slave and the second cylindrical body; and a clutch switching mechanism for selectively switching the clutch mechanism between the engaging position and the disengaging position.

16. The hub transmission according to claim 15 wherein the clutch switching mechanism includes a centrifugal force mechanism for selectively switching the clutch mechanism between the engaging position and the disengaging position.

17. The hub transmission according to claim 16 further comprising a one-way clutch mechanism disposed between the planet gear mechanism and the slave.

18. The hub transmission according to claim 17 wherein the one-way clutch mechanism is disposed between the planet gear carrier and the slave.

19. The hub transmission according to claim 2 further comprising:

a clutch mechanism switchable between an engaging position for engaging the slave and the second cylindrical body and a disengaging position for disengaging the slave and the second cylindrical body; and a clutch switching mechanism for selectively switching the clutch mechanism between the engaging position and the disengaging position.

20. The hub transmission according to claim 19 wherein the clutch switching mechanism includes a centrifugal force mechanism for selectively switching the clutch mechanism between the engaging position and the disengaging position.

21. The bicycle hub transmission according to claim 5 wherein the first ball race is disposed on the smaller diameter inner peripheral surface of the first driving member, and wherein the second ball race is disposed on the smaller diameter inner peripheral surface of the second driving member.

22. The bicycle hub transmission according to claim 6 wherein the threaded joint is disposed at the housing space.

23. The bicycle hub transmission according to claim 7 wherein the serration joint is disposed at the housing space.

* * * * *